J. MOTHERAL.
Grubber and Stump-Extractor.

No. 197,790. Patented Dec. 4, 1877.

WITNESSES:
Francis McArdle
J. H. Scarborough

INVENTOR:
J. Motheral
BY Munn & Co.
ATTORNEYS.

UNITED STATES PATENT OFFICE.

JOHN MOTHERAL, OF NORTH McGREGOR, IOWA.

IMPROVEMENT IN GRUBBER AND STUMP-EXTRACTOR.

Specification forming part of Letters Patent No. 197,790, dated December 4, 1877; application filed September 29, 1877.

*To all whom it may concern:*

Be it known that I, JOHN MOTHERAL, of North McGregor, in the county of Clayton and State of Iowa, have invented a new and Improved Grubber and Stump-Extractor, of which the following is a specification:

This invention has relation to means for grubbing or extracting stumps from the ground; and the nature of my invention consists in a standard which is mounted so that it can turn about its vertical axis, and which is held in an upright position by means of stay-braces staked to the ground, in combination with a rope or chain and pulley, a large spur-wheel, and a pinion engaging therewith, and a hand-crank on the pinion-shaft, as will be hereinafter explained.

Figure 1:
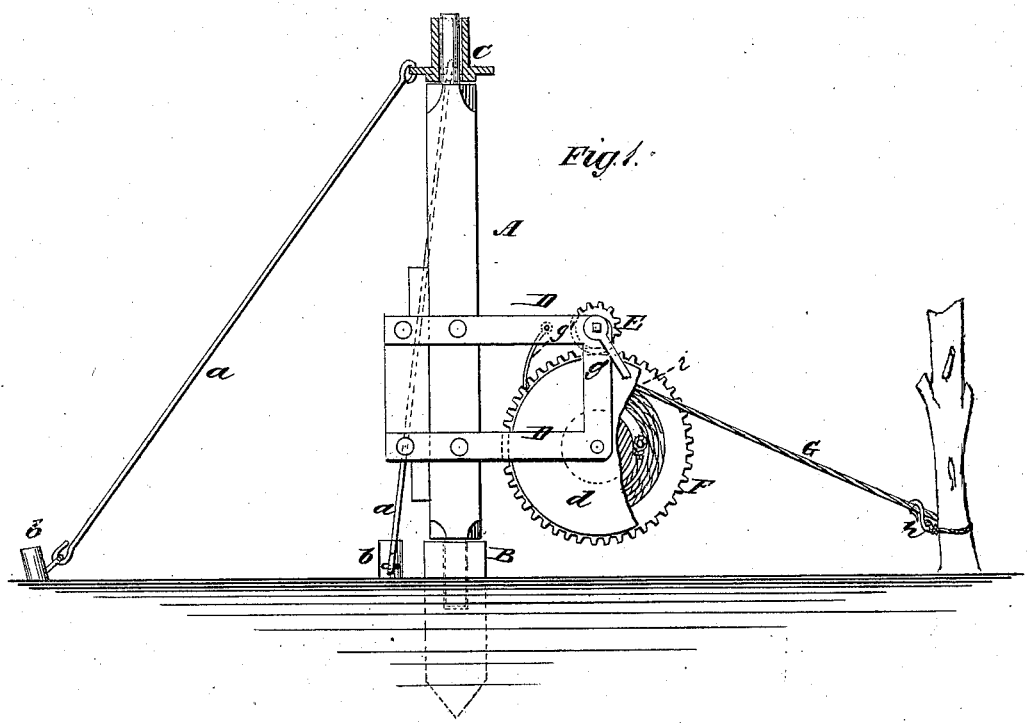
Figure 2:
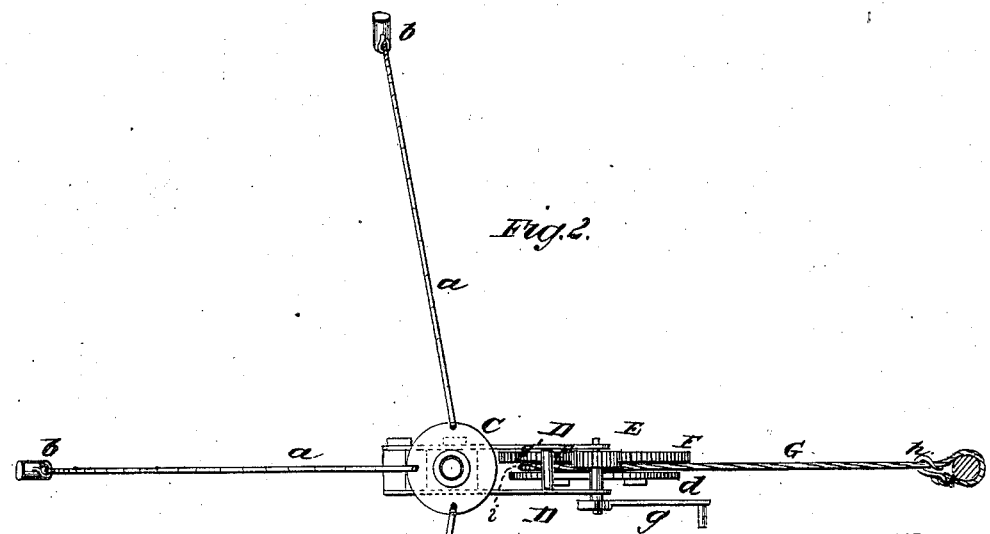

In the annexed drawings, Figure 1 is a side elevation of my improved stump-extractor with parts broken away. Fig. 2 is a top view of the extractor.

Similar letters of reference indicate corresponding parts.

The letter A designates a standard, which is stepped in a block or stake, B, fixed solidly in the ground, and which is free to turn in a flanged ferrule, C, to the flange of which three or more guy-chains, wires, or ropes, $a$, are secured. The lower ends of the chains $a$ are connected, in any suitable manner, to stakes $b$, which are driven firmly into the ground. The standard A is thus firmly braced, and it is allowed to receive free horizontal rotation.

D D are strong arms, which are horizontally arranged and strongly secured to the standard A. These arms or brackets D D have journaled in their outer ends the shafts of two spur-wheels, E F.

The pinion-wheel E bears a hand-crank, $g$, on one end of its shaft, and engages with the teeth of the large spur-wheel F, which, in combination with a disk, $d$, and a hub, form an annular groove, $i$, in which is wound a rope or chain, G, having a grappling-hook, $h$, on one end.

When the standard A is erected and strongly braced, as above described, the rope or chain G is passed around the stump which is to be extracted, and secured thereto by the hook $h$. The attendant then extracts the stump by turning the crank $g$ and winding up the rope or chain.

To prevent a retrograde movement of the crank, a pawl, $g'$, is provided, which engages the spur-wheel F.

Having thus described my invention, I claim as new and desire to secure by Letters Patent—

The grubber and stump-extractor herein described, consisting essentially of the oscillating post or standard A, bottom and top bearings B C, guy-rods $a$, stakes $b$, frame D, spur-wheels E F, disk $d$, having a grooved hub, and the rope or chain G, all constructed and relatively arranged as herein set forth.

JOHN MOTHERAL.

Witnesses:
WILLIAM SIMEON YOUNG,
ERNEST JOHN FOSTER.